(12) United States Patent
Meyer

(10) Patent No.: US 11,933,439 B2
(45) Date of Patent: Mar. 19, 2024

(54) PRESSURE HOSE AND METHOD FOR PRODUCING A PRESSURE HOSE

(71) Applicant: UNIWELL ROHRSYSTEME GMBH & CO. KG, Ebern (DE)

(72) Inventor: Hans-Peter Meyer, Hemer (DE)

(73) Assignee: UNIWELL ROHRSYSTEME GMBH & CO. KG, Ebern (DE)

( * ) Notice: Subject to any disclaimer, the term of this patent is extended or adjusted under 35 U.S.C. 154(b) by 674 days.

(21) Appl. No.: 16/490,396

(22) PCT Filed: Mar. 6, 2018

(86) PCT No.: PCT/EP2018/055398
§ 371 (c)(1),
(2) Date: Aug. 30, 2019

(87) PCT Pub. No.: WO2018/162441
PCT Pub. Date: Sep. 13, 2018

(65) Prior Publication Data
US 2020/0025319 A1 Jan. 23, 2020

(30) Foreign Application Priority Data
Mar. 10, 2017 (DE) ...................... 10 2017 002 275.5

(51) Int. Cl.
*F16L 33/34* (2006.01)
*B29C 48/00* (2019.01)
(Continued)

(52) U.S. Cl.
CPC .......... *F16L 33/34* (2013.01); *B29C 48/0022* (2019.02); *B29C 48/09* (2019.02);
(Continued)

(58) Field of Classification Search
CPC .... F16L 11/11; F16L 11/15; F16L 9/06; F16L 25/0063; F16L 25/0036; F16L 27/11;
(Continued)

(56) References Cited

U.S. PATENT DOCUMENTS

| 4,003,685 A | 1/1977 | Maroschak |
|---|---|---|
| 5,320,797 A | 6/1994 | Hegler |

(Continued)

FOREIGN PATENT DOCUMENTS

| CH | 628722 A5 | 3/1982 |
|---|---|---|
| CN | 1976798 A | 6/2007 |

(Continued)

OTHER PUBLICATIONS

International Preliminar Report on Patentability for International Application No. PCT/EP2018/055398 dated Sep. 19, 2019.
(Continued)

*Primary Examiner* — William S. Choi
(74) *Attorney, Agent, or Firm* — Jason H. Vick; Sheridan Ross, PC

(57) ABSTRACT

A pressure hose (1) for a water-carrying system is shown and described, especially for connecting sanitary taps or for connecting parts of the water-carrying system, having a corrugated inner hose (2) made of plastic, wherein at least one hose end (3, 5) of the pressure hose (1) is provided with a connecting piece (4, 6), designed such that it differs from the inner hose (2), for joining the pressure hose (1) to a complementarily designed connecting piece of a sanitary tap and/or a part of the water-carrying system. According to the invention, it is provided that the inner hose (2) and the connecting piece (4, 6) are formed as one piece and the inner hose (2) and the connecting piece (4, 6) are preferably produced via extrusion in a common extrusion process.

8 Claims, 6 Drawing Sheets

(51) Int. Cl.
*B29C 48/09* (2019.01)
*B29C 48/13* (2019.01)
*B29C 48/30* (2019.01)
*E03C 1/02* (2006.01)
*E03C 1/04* (2006.01)
*F16L 11/15* (2006.01)
*F16L 25/00* (2006.01)
*F16L 33/00* (2006.01)
*F16L 33/18* (2006.01)
*F16L 33/28* (2006.01)
*B29L 23/18* (2006.01)

(52) U.S. Cl.
CPC ............ *B29C 48/13* (2019.02); *B29C 48/303* (2019.02); *E03C 1/025* (2013.01); *E03C 1/0403* (2013.01); *F16L 11/15* (2013.01); *F16L 25/0036* (2013.01); *F16L 25/0063* (2013.01); *F16L 33/006* (2013.01); *F16L 33/18* (2013.01); *F16L 33/28* (2013.01); *B29C 48/0021* (2019.02); *B29L 2023/18* (2013.01)

(58) Field of Classification Search
CPC ........ F16L 27/111; F16L 51/02; F16L 51/025; B29C 48/09; B29C 48/13; B29C 49/0015; B29C 49/0021; B29C 49/0022; B29C 53/22; B29C 53/30
USPC .............................................. 285/285.1, 903
See application file for complete search history.

(56) References Cited

U.S. PATENT DOCUMENTS

| | | | |
|---|---|---|---|
| 5,803,128 A * | 9/1998 | Reed | F16L 11/15 |
| 5,829,483 A | 11/1998 | Tukahara et al. | |
| 6,053,214 A | 4/2000 | Sjoberg et al. | |
| 6,682,689 B1 | 1/2004 | Cuenot | |
| 6,764,627 B2 * | 7/2004 | D'Angelo | B29C 48/09 |
| 7,600,793 B2 | 10/2009 | Hegler | |
| 7,849,884 B2 | 12/2010 | Dickel | |
| 9,068,677 B2 * | 6/2015 | Oh | F16L 25/0036 |
| 9,238,118 B2 | 1/2016 | Woelfel | |
| 10,563,796 B2 | 2/2020 | De Nora | |
| 2004/0074552 A1 * | 4/2004 | Woelfel | B29C 48/13 |
| 2004/0135369 A1 * | 7/2004 | Schroter | 285/903 |
| 2005/0017395 A1 | 1/2005 | Dietrich et al. | |
| 2005/0081381 A1 * | 4/2005 | Ingram | F16L 25/0036 |
| 2007/0024054 A1 * | 2/2007 | Ko | 285/903 |
| 2007/0222208 A1 | 9/2007 | Hegler | |
| 2008/0191472 A1 * | 8/2008 | Vieregge | |
| 2009/0032131 A1 | 2/2009 | Boettner | |
| 2010/0051131 A1 | 3/2010 | Dickel | |
| 2012/0067452 A1 * | 3/2012 | Briand | |
| 2014/0311610 A1 * | 10/2014 | Kwon | F16L 11/15 |
| 2018/0156101 A1 * | 6/2018 | Webel | F16L 51/025 |

FOREIGN PATENT DOCUMENTS

| | | |
|---|---|---|
| CN | 102441997 A | 5/2012 |
| CN | 106104129 A | 11/2016 |
| DE | 19654435 A1 | 7/1998 |
| DE | 102008039991 B3 | 10/2009 |
| DE | 202013005740 U1 | 8/2013 |
| DE | 102013109111 A1 | 3/2014 |
| EA | 000977 B1 | 8/2000 |
| EP | 0563575 A2 | 10/1993 |
| EP | 2192337 A1 | 6/2010 |
| EP | 2159465 B1 | 3/2011 |
| EP | 2431515 A1 | 3/2012 |
| EP | 2650580 A1 | 10/2013 |
| JP | 2005-529199 A | 9/2005 |
| JP | 2011-047467 A | 3/2011 |
| KR | 1780894 B1 * | 9/2017 ............ F16L 51/025 |
| WO | WO 01/83187 A1 | 11/2001 |
| WO | WO 03/035364 A1 | 5/2003 |
| WO | WO 03/093363 A1 | 11/2003 |

OTHER PUBLICATIONS

International Search Report for International Application No. PCT/EP2018/055398 dated May 25, 2018.
Written Opinion for International Application No. PCT/EP2018/055398 dated May 25, 2018.
Decision of Refusal (Including Translation) for corresponding Japanes Patent Application No. 2019-570617, dated Jan. 4, 2023.
U.S. Appl. No. 18/238,767, filed Aug. 28, 2023, Meyer.

* cited by examiner

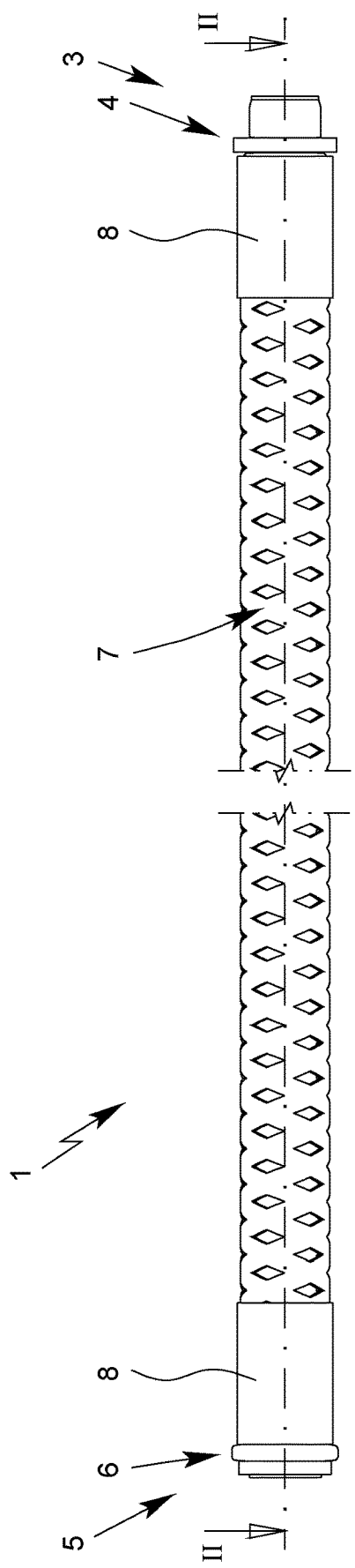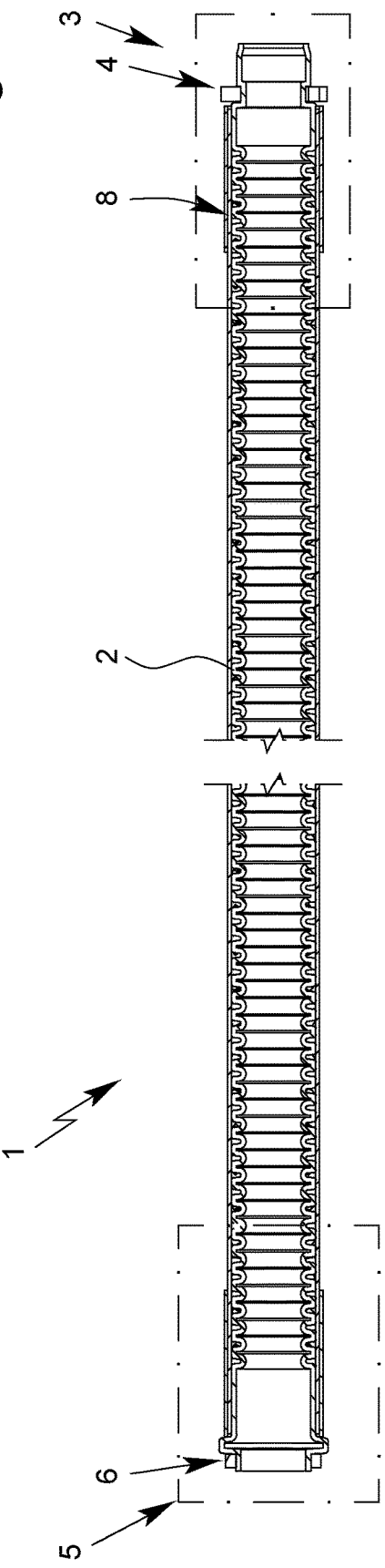

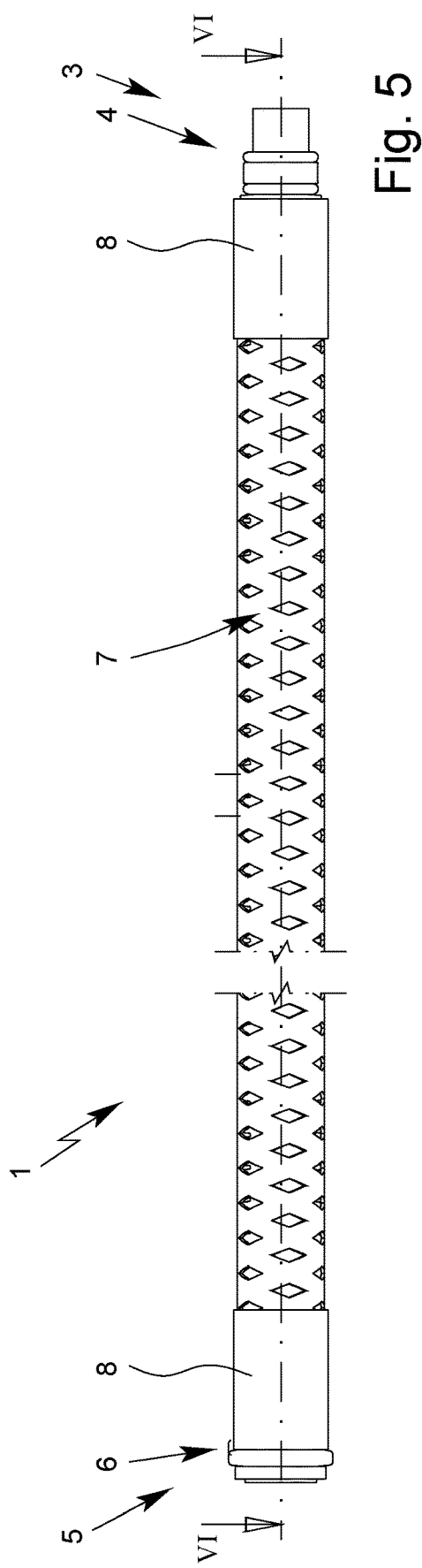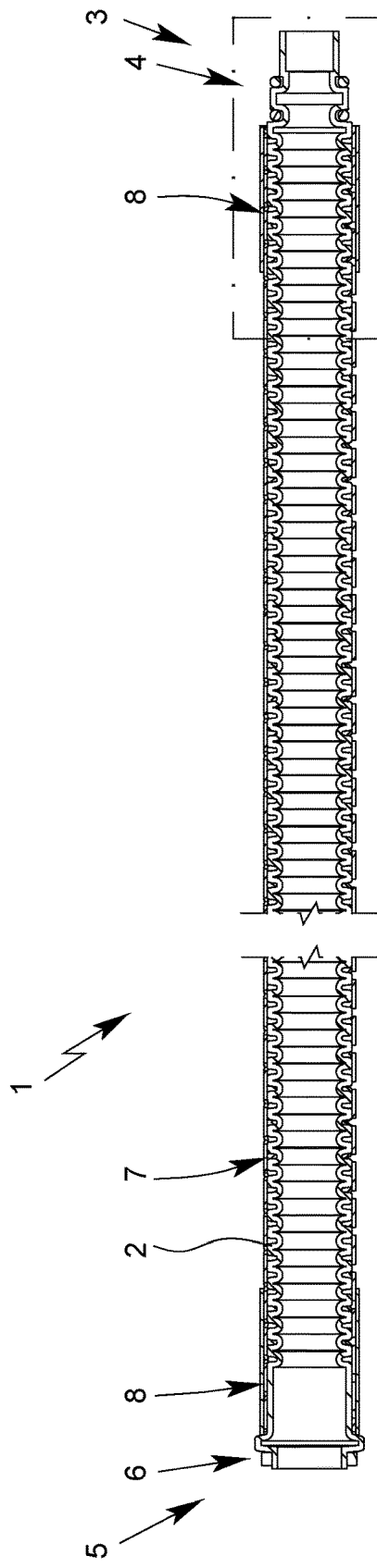

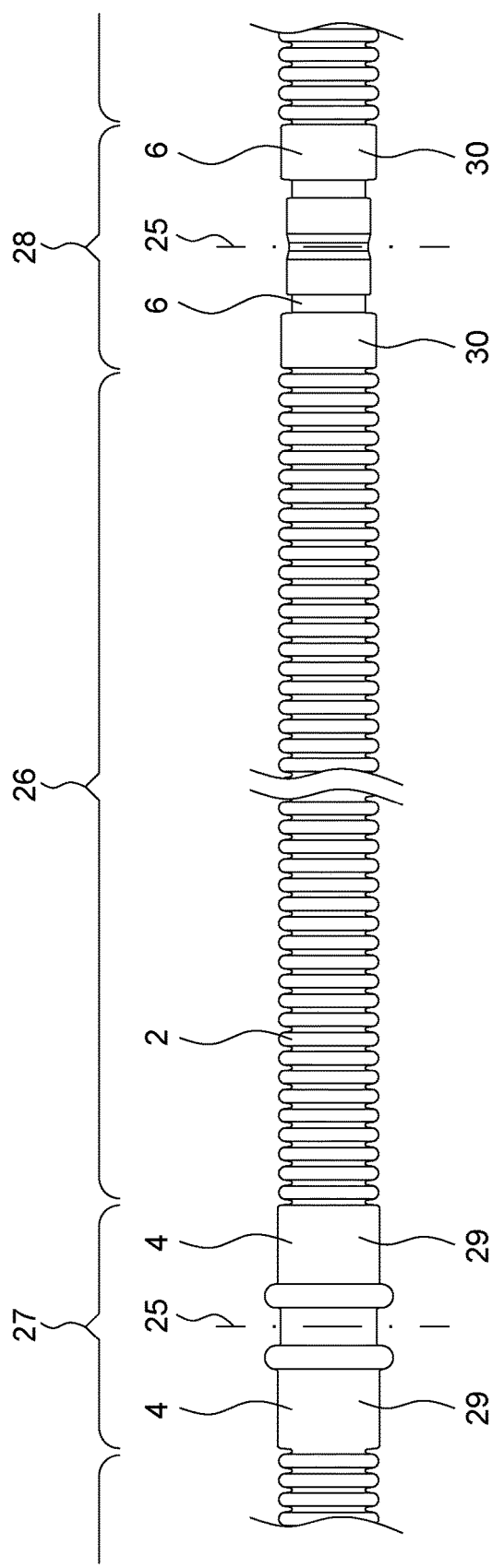
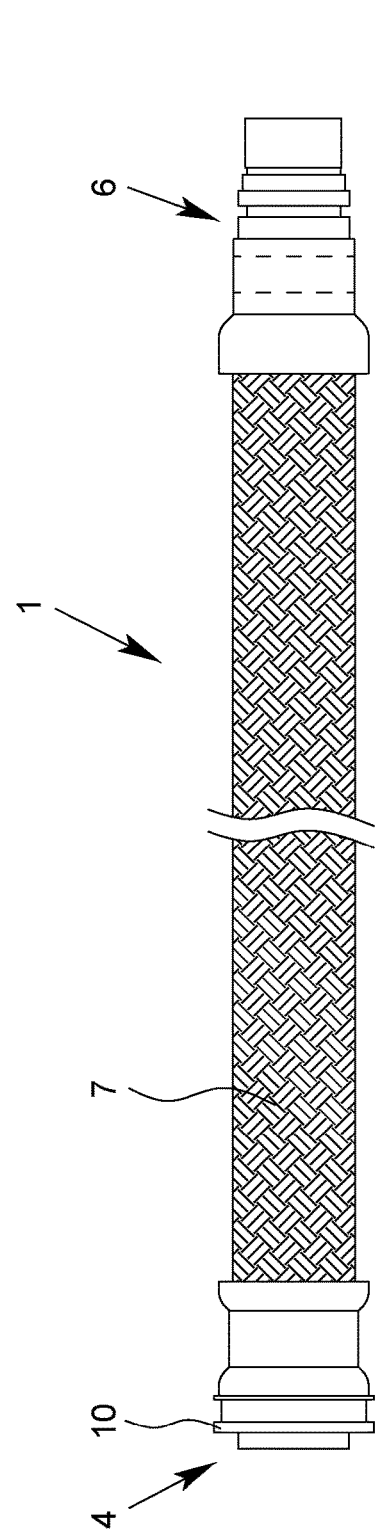

PRESSURE HOSE AND METHOD FOR PRODUCING A PRESSURE HOSE

CROSS REFERENCE TO RELATED APPLICATIONS

This application is a national stage application under 35 U.S.C. 371 of PCT Application No. PCT/EP2018/055398 having an international filing date of 6 Mar. 2018 which designated the United States, which PCT application claimed the benefit of German Application No. 10 2017 002 275.5 filed 10 Mar. 2017, each of which are incorporated herein by reference in their entirety

SUMMARY

The present invention relates to a pressure hose for a water-carrying system for connecting sanitary taps, having a preferably corrugated inner hose made of plastic, wherein at least one hose end of the pressure hose is provided with a connecting piece, designed such that it differs from the inner hose, for joining the pressure hose to a complementarily designed connecting piece of a sanitary tap and/or a part of the water-carrying system. Furthermore, the present invention relates to a method for producing a pressure hose.

Pressure hoses are used in the context of the installation of water-carrying systems. A pressure hose of the aforementioned kind for use in the sanitary field is known for example from EP 2 159 465 B1. The pressure hose described in the mentioned document comprises an inner hose made of plastic as the water-carrying fluid-tight medium and a sheathing made from a braid to implement a pressure-stable design. Furthermore, a separate connecting piece is provided at one hose end, which is designed for connecting to a complementary designed connecting piece of the sanitary tap. For the force-locking connection of the pressure hose to the connecting piece, the corresponding hose end is press-fitted onto the connecting piece, for which a pressing sleeve is used. The pressing sleeve is press-fitted from the outside onto the sheathing and/or the inner hose.

A shortcoming of the pressure hose known from EP 2 159 465 B1 is that the inner hose is subjected to a significant pressing force directed radially inward on account of the pressing process, so that the inner hose is irreversibly compressed with the connecting piece in the connecting zone, accompanied by a narrowing of the cross section in the region of the connecting piece. Consequently, the water flow is accelerated and/or the water pressure is reduced in the region of the connecting piece, so that water may be tapped at a lower water pressure. Furthermore, the mentioned narrowing of the cross section in the region of the connecting piece and/or the hose end is accompanied by a reduction in the maximum flow rate through the pressure hose.

As for the material of the connecting piece, metal alloys are usually employed in the prior art. In this context, reference is made to DE 196 54 435 A1, from which a pressure hose with a connecting piece made of brass is known. A drawback to this choice of material is the relatively high cost of the raw material, which has a negative impact on the product price and thus on acceptance in the sales market. It should be taken into account that metal alloys sometimes involve a speculative investment, with occasionally significant price fluctuations. This price instability of the metal raw material also has negative impact on the production costs and ultimately on the product price in the sales market.

In addition to the aforementioned economic drawbacks, it must be considered from the standpoint of manufacturing technology that connecting pieces made of metal alloys require a laborious machining process. It must be considered that sanitary taps often have manufacturer-specific connecting pieces with different connection geometries. Accordingly, the connecting pieces must also be adapted individually to the complementary connection geometries dictated by the specific manufacturer, which is time-consuming and cost-intensive.

Given this background, object of the present invention is therefore to provide a flexible pressure hose and a method for the production of a pressure hose, wherein the pressure hose has improved flow behavior at the inlet and outlet as compared to the prior art, and the pressure hose can be fabricated easily and cost-effectively.

The aforementioned object is achieved by a pressure hose with the features of patent claim 1 and by a method for production of a pressure hose with the features of patent claim 9. Advantageous developments are the subject matter of the dependent claims.

The basic idea of the pressure hose according to the invention is that the inner hose and the connecting piece are formed as one piece and are produced by extrusion in a common extrusion process. The pressure hose according to the invention can be obtained by cutting a profile hose produced by extrusion in a continuous process, with the profile hose having for example corrugated hose portions, which are joined together by further hose portions with different hose geometry in the longitudinal direction of the profile hose. The hose geometry of the further hose portion may correspond for a portion to the connection geometry of a connecting piece of the pressure hose according to the invention. Especially preferably, two identical connection geometries are formed in the region of the further hose portion, one behind the other in the longitudinal direction of the profile hose and arranged in mirror symmetry to an axis of symmetry running transversely to the longitudinal axis of the profile hose, so that when the profile hose is cut to length or sliced along the axis of symmetry two hose portions are produced with connecting pieces formed at the ends. Further preferred is an embodiment in which further hose portions with a first hose geometry and further hose portions with a second connection geometry alternate in the longitudinal direction of the profile hose and/or in the extrusion direction, with each further hose portion having in turn a hose geometry differing from a corrugated profile. By cutting the profile hose to length preferably in the middle region of the further hose portions, one obtains hose portions with a corrugated profile for example, at the ends of which different connecting pieces are formed.

A first hose portion with preferably corrugated profile may form the inner hose of the pressure hose according to the invention; further hose portions with connection geometry differing from the corrugated shape may form connecting pieces of the pressure hose according to the invention. Second hose portions and third hose portions with connection geometry differing from the first hose portion may be provided, with the second hose portions and third hose portions having different connection geometries in order to form different connecting pieces at the ends of an inner hose.

The purpose of use of the present invention lies in the installation of sanitary taps and/or in the sanitary area. In this context, by the term "sanitary tap" as it is used in the course of the present invention is meant a preferably permanently installed or movable structural device designed for the tapping of water as needed, for example in the household.

Accordingly, the mentioned term should preferably be interpreted in the broad sense. Examples of sanitary taps of the mentioned kind are chosen in particular from the group of wash basin taps and/or shower taps, and/or chosen from the group of kitchen taps, especially sink taps, and/or chosen from the group of (handheld) showers, especially shower heads and/or kitchen sprayers. Furthermore, the use of the pressure hose according to the invention is also possible for example for the water supply of dishwashers and/or washing machines.

Furthermore, by the term "connecting piece" as it is used in the course of the present invention is meant preferably a connecting part for the tight attachment of a hose end of the pressure hose to a complementarily designed connecting piece of a sanitary tap and/or an angle valve and/or a part of the water-carrying system. The connecting piece has a preferably manufacturer-specific and/or country-specific and, if applicable, standardized design of connection geometry in order to assure an accurate fitting and/or tight connection to the complementarily designed connecting piece (with corresponding complementary connection geometry).

The inner hose preferably has a corrugated contour in the axial direction. The corrugated shape is further preferably sinusoidal. This special corrugated shape favors a uniform and unhindered flow of water through the inner hose. Furthermore, the corrugated configuration of the inner hose significantly improves the flexibility and/or bendability of the hose, or even makes a bending at all possible, depending on the hose material.

Because of the single-piece design of the inner hose and the connecting piece with a different design from the inner hose, the attachment of the connecting piece to the hose end of the pressure hose as provided in the prior art—usually with force locking—is thus dispensed with. This effectively eliminates the associated disadvantages in regard to the flow behavior in the region of the connecting piece. In this way, uniform flow conditions are realized along the entire length of the pressure hose, wherein the maximum flow cross section is also available in the region of the connecting piece. This is especially advantageous for inner hoses formed with relatively thin walls, for example with a wall thickness in the range of 1 mm, since these are vulnerable to a cross section narrowing due to pressing effects in the pressure hoses for sanitary use that are known in the prior art. Moreover, the formation of leaks is ruled out by the one-piece design of the inner hose and the connecting piece.

Furthermore, it should be noted that the one-piece design of the inner hose and the connecting piece made from a plastic material makes possible a cost-effective and/or resource-saving manufacture that is not subject to the aforementioned price fluctuations of exchange-traded metal alloys and/or raw materials.

As for the one-piece production of the inner hose and the connecting piece, this is accomplished by extrusion technology. In this way, the cost-effective attachment of the connecting piece or connection fitting to the inner hose is realized as part of a continuous production process, which is especially advantageous in the context of series production.

It should be noted in general that the connection geometry of the connecting piece produced according to the invention is qualitatively comparable—for example in regard to the contour and/or fitting precision and the sealing behavior—to the separately formed connecting pieces known in the prior art, such as those made of brass. In particular, no subsequent shaping and/or machining of the connecting piece is necessary, so that the pressure hose according to the invention can be obtained in fewer work steps. The inner hose and the at least one connecting piece can be obtained in just a single extrusion process.

According to one preferred embodiment, it is provided that both hose ends are provided with differently designed connecting pieces, wherein a first connecting piece is designed to connect a first hose end to a complementarily designed connecting piece of a tap, especially a sanitary and/or kitchen tap, and a second connecting piece is designed to connect a second hose end to a complementarily designed connecting piece of a water supply line, especially an angle valve. In particular, the connecting pieces are designed differently and/or individually with respect to the corresponding connecting pieces or connection fittings of the water supply line on the one hand and the sanitary tap on the other hand.

For the pressure-resistant design of the pressure hose, it is preferable for the inner hose to be surrounded substantially along its entire length by a sheathing, preferably a metal braiding, particularly preferably a stainless-steel braiding. Alternatively, the sheathing may also consist of a plastic braiding, especially a polyester braiding. However, it is understood that the connecting piece need not be enclosed by the sheathing, in order to make possible an unhindered connection of the connecting piece to the complementarily designed connecting piece of a sanitary tap and/or a water supply line.

Preferably, it is provided that the sheathing is pressed onto the inner hose from the outside by means of a clamping element, preferably a pressing sleeve, at least at one hose end. The pressing sleeve ensures a secure connection between the inner hose and the sheathing and forms an effective kink protection in the region of the hose end.

It is advisable for the connecting piece, especially the first connecting piece, to have on its circumference at least one encircling receiving groove to receive a sealing element, especially a sealing ring. This ensures an effective circumferential sealing in particular of the first connecting piece against the complementary connecting piece, especially against the sanitary tap.

Preferably, it is provided that the connecting piece, especially the second connecting piece, has on its circumference at least one radially protruding shoulder, with the shoulder preferably forming an axial end stop for a tightening element, preferably a union nut. Preferably, the second connecting piece is tightened by means of the tightening element against a complementarily designed connecting piece of part of the water-carrying system, especially a water supply line and/or an angle valve, by the tightening element being screwed onto a complementary threaded portion.

Especially preferably, the connecting piece, especially the second connecting piece, may comprise at its end face an encircling holding and/or receiving region for holding and/or for receiving a sealing element, especially a sealing ring. This allows in particular an effective end-face sealing between the second connecting piece and a complementarily designed connecting piece of a water supply line, for example an angle valve.

In order to further improve the flow behavior in the region of the connecting piece, it is preferably provided that the connecting piece is formed free of corrugations and/or with a cylindrical inner contour on the inside in the axial direction, at least in some regions, preferably entirely. In this way, a homogeneous and/or low-noise inflow and/or outflow of the fluid stream is assured within the pressure hose according to the invention.

It is preferable for the connecting piece to have, at least in some regions, especially in a transitional region to the inner hose, substantially the same outer diameter as the inner hose. This assures a good kink-resistance and/or the formation of a secure bearing surface for the clamping element.

Moreover, the connecting element may have a larger inner diameter and/or flow cross section than the inner hose, especially in a transitional region to the inner hose. This allows an optimal inflow and/or outflow in the region of the hose ends.

Especially preferably, the pressure hose is designed for drinking water installations. In connection with requirements and testing guidelines for pressure-resistant and flexible hose lines for drinking water installations, reference is made in particular to the worksheet W 543 of the Deutscher Verein des Gas- and Wasserfaches (German Association of Gas and Water; DVGW), the requirements there being preferably entirely fulfilled by the pressure hose according to the invention. Further preferably, the pressure hose according to the invention fulfills the requirements of the DIN EN 13618 standard in their entirety.

Preferably, the material of the inner hose and/or the connecting piece is chosen such that the pressure hose according to the invention is suitable and/or approved for the carrying of drinking water. Here, reference may be made to the guidelines set forth by the Vereinigung Kunststoffe im Trinkwasser (Association for Plastics in Drinking Water; KTW), the testing being done preferably in accordance with worksheet W 270 of the DVGW. Examples of materials for the inner hose are chosen preferably from the family of the polyolefins, especially polypropylene and/or polyethylene.

The pressure hose according to the invention is preferably designed for a water pressure of at least 0.5 bar, further preferably of a least 2 bar, especially preferably of up to 40 bar or more.

The pressure hose, especially the inner hose, preferably has an inner diameter of at least 5 mm, preferably of at least 6 mm, especially preferably of at least 7 mm and/or of at most 15 mm, preferably of at most 10 mm, especially preferably of 8 mm, for example.

The pressure hose, especially the sheathing, preferably has an outer diameter of at least 8 mm, preferably of at least 9 mm, especially preferably of at least 10 mm and/or of at most 20 mm, preferably of at most 15 mm, for example of 13 mm.

Preferably, the pressure hose is designed to carry water flows with a temperature of up to 100° C. or more, preferably of at most 90° C., further preferably of at most 80° C., especially preferably of at most 70° C., depending on the material. Basically, however, materials can also be used which tolerate higher water temperatures.

In particular, the pressure hose according to the invention has a tensile strength per 9.2 DIN EN 1113 of at least 300 N, preferably of at least 400 N, especially preferably of at least 500 N.

Preferably, the inner hose can have a wall thickness in the range of 0.5 mm to 5 mm, preferably in the range of 0.6 mm to 4 mm, especially in the range of 0.7 mm to 3 mm, especially preferably in the range of 0.8 mm to 2 mm.

Preferably, the material used for the inner hose and the connecting pieces is polyphenylsulfone (PPSU). This material is especially distinguished by its high long-term temperature resistance of significantly more than 100° C. Because of its low permeability to water, this plastic is especially suited to use in the sanitary and tap field. PPSU is suitable as a metal replacement on account of its high hardness. Thus, a good shape stability is achieved in particular for the connecting pieces.

Due to the high hardness of PPSU, a cutting of the material by shear forces is difficult to achieve, so the material can be separated by machining, especially by sawing.

In particular, the hardness of PPSU is so high that a corrugated configuration, preferably a sinusoidal one, can be provided for a sufficiently good flexibility of the pressure hose.

With lower requirements on the long-term temperature resistance as well as the strength and/or pressure-stability of the pressure hose, materials from the family of the polyamides or polyolefins, for example, can also be used to produce the pressure hose, especially polyamide 12, polypropylene and/or polyethylene. When PPSU is used, one may in particular do without the stainless-steel braiding surrounding the inner hose, since the pressure stability of PPSU is sufficiently high.

A further subject matter of the present invention relates to a method for producing a pressure hose for a water-carrying system for the connection of sanitary and/or kitchen taps, wherein a corrugated inner hose and at least one connecting piece for joining the pressure hose to a complementarily designed connecting piece of a sanitary tap and/or a part of the water-carrying system are formed as one piece and are produced via extrusion in a common extrusion process. In this way, the aforementioned benefits can be realized accordingly.

A continuous one-piece production of a profile hose with first hose portions arranged alternately in the longitudinal direction of the hose with further hose portions joining the first hose portions to each other can be done by using a so-called "constantly moving mold" consisting of a plurality of two-piece tool pairs, so-called tool jaws, or just jaws. The production of the pressure hose according to the invention can be done by respectively cutting the profile hose in the region of the further hose portions.

The individual tool jaws can be moved by means of chains in the production direction along a guide, for example a rail system. In front of the exit nozzle of an extruder in the production direction, the respective pair of jaws is brought together, i.e., a tubular tool geometry is formed which is open in the production direction. The pair of jaws then moves along at the speed of extrusion in the production direction. After a brief time, the pair of jaws reaches the exit nozzle of the extruder. From this moment onward, the material is extruded into the pair of jaws. The extrusion nozzle may have a mandrel on its inside, causing a tubular delivery of the material from the exit nozzle of the extruder. A compressed air feed may be formed inside the mandrel, causing the material in the tool jaws to be forced against the wall of the tool jaws, thereby forming the outer and inner geometry of the profile hose. Alternatively, the pairs of jaws may have exit openings by which a negative pressure is created inside the pair of jaws. Thus, the formation of the profile hose may also be done with the aid of a negative pressure.

When the first pair of jaws has advanced far enough in the production direction, a second pair of jaws is brought together behind the first pair of jaws in the production direction, so that the two pairs of jaws rest against each other. The two pairs of jaws thus form an extrusion tool. At this time, the material is being extruded into the first pair of jaws, but not yet into the second pair of jaws. Once the geometry of the first pair of jaws is entirely filled with material, the two pairs of jaws are advanced far enough that, from this time on, the extruder can deliver the material into the second pair of jaws. The first pair of jaws moves along with the extrudate in the production direction until the material inside the pair of jaws has cooled down enough for the formed profile hose to be dimensionally stable and able to be removed from the mold.

Subsequently, the first pair of jaws can be opened, with the two parts of the first pair of jaws moving in respectively opposite directions, preferably perpendicular to the production direction. The individual jaws are moved back again by the chain system and/or rail system to a position in the position direction in front of the exit nozzle of the extruder. The pair of jaws can then be used again for the hose extrusion. The jaws preferably form two cycles, opposite to each other perpendicular to the production direction, each with jaws situated one behind the other.

In order to assure an optimal formation of the profile hose, a sealing plug may be arranged at a defined distance in the production direction in front of the exit nozzle. The sealing plug ensures that a sufficiently high pressure is generated by the compressed air feed to form the profile hose. Alternatively, the sealing plug serves to make a negative pressure present inside the pair of jaws act over a length long enough to form the profile hose.

By different inner contours of the pairs of jaws, portions of the hose can be embodied differently. The first pair of jaws, for example, may dictate at least a first connection geometry for the later connection of the pressure hose according to the invention to a sanitary tap, while the second, subsequent pair of jaws can form a corrugated hose portion of the profile hose, for example, and thus at least a portion of an inner hose for the pressure hose according to the invention. A third, further subsequent pair of jaws may be configured, for example, like the second pair of jaws and once again form a corrugated hose portion of the profile hose, for example. By varying the number of the subsequent second pairs of jaws, one can easily dictate the length of the corrugated hose portions produced by extrusion and thus the length of the inner hose. Alternatively, the third pair of jaws can also form at least a second, different connection geometry of the profile hose. In this way, a profile hose can be created with hose geometry varying by portions, wherein first hose portions with corrugated profile, for example, can be separated from each other by further hose portions, wherein the further hose portions have the same or different connection geometries. Preferably, each further hose portion has two connection geometries arranged in mirror symmetry to an axis of symmetry extending transversely to the longitudinal axis of the profile hose.

By severing the profile hose in the region of an axis of symmetry, two (first) hose portions are obtained, having an identical connection geometry at the ends. The first hose portion then forms the inner hose of the pressure hose according to the invention, while the connection geometries at the ends of the first hose portion form the connecting pieces of the pressure hose.

After a further cooling behind the moving mold jaws in the production direction, which is accomplished for example with the aid of a water bath, the profile hose with a length of 500 to 700 m, for example, can be wound on a roll, thus simplifying its subsequent transport. Alternatively, after cooling the profile hose can be cut to length in the region of the further hose portions and the pressure hoses according to the invention so obtained can then be wound up or packaged individually.

It is more advantageous for all pairs of jaws to be of the same length. A corresponding rail system for guiding and leading the jaws may also have individual "waiting positions" for the jaws, and/or jaws can be exchanged so that different connection geometries or hoses of different length can be produced as needed.

In this way, pressure hoses according to the invention can be produced individually with different lengths in one production line. This does not require a costly refitting of a blow molding tool or an injection molding tool as in the methods of the prior art. In methods known in the prior art, there are procedural limitations on the size of the pressure hoses to be produced. According to the invention, pressure hoses of any given length can be produced by the above-described extrusion. Thus, even the production of hoses up to 3 m in length or even longer is possible without any problem.

For the first time, in particular, the invention provides for the production of a pressure hose consisting of PPSU for the sanitary area with the required connecting pieces as a single piece in a common extrusion process. Due to the high pressure resistance of PPSU, one may also forgo a sheathing of the pressure hose with a metal braiding.

When PPSU is used as the material for the profile hose, the jaws can be heated up to a temperature of around 250° C. to 300° C. due to the high processing temperature of the material. In this way, outstanding material properties of the pressure hose according to the invention can be assured.

BRIEF DESCRIPTION OF THE DRAWINGS

Further benefits, features, properties and aspects of the present invention will emerge from the claims and the following specification of preferred embodiments with the aid of the drawing. The described and/or depicted benefits, features, properties and aspects of the present invention may be combined with each other as required, even if this is not described or shown in detail. Indicated ranges include all integer values lying in between.

In the drawing:

FIG. 1 shows a side view of a pressure hose according to the invention in a first embodiment, FIG. 2 shows a schematic longitudinal section of the pressure hose shown in FIG. 1, FIG. 5 shows a side view of the pressure hose according to the invention in a second embodiment;

FIG. 6 shows a schematic longitudinal section of the pressure hose according to the invention shown in FIG. 5;

FIG. 8 shows a side view of a profile hose produced by extrusion in a continuous process having first corrugated hose portions and further hose portions alternately arranged in the longitudinal direction of the profile hose, the further hose portions forming the connection geometries for the connection to a sanitary tap;

FIG. 9 shows a side view of a pressure hose according to the invention in a third embodiment and FIG. 10 shows a schematic representation of a device to carry out an extrusion process for producing a profile hose of the kind shown in FIG. 8.

DETAILED DESCRIPTION

Figure 3:
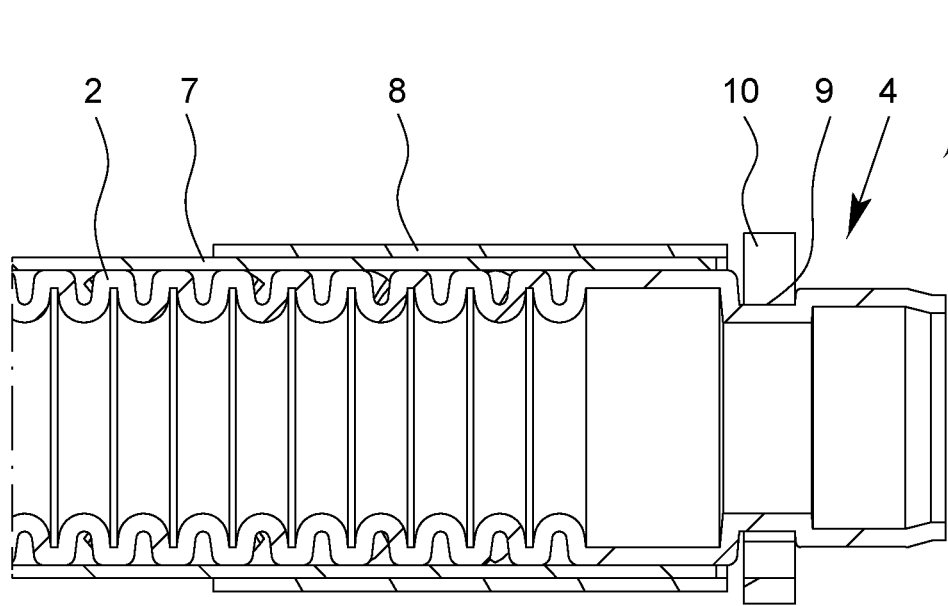
FIG. 3 shows an enlarged section of FIG. 2 in the region of a first hose end of the pressure hose according to the invention.

In the following description, the same reference numbers are used for the same and similar parts and components, with corresponding properties and features resulting from them even without a repeated description.

FIG. 1 shows, in a schematic side view, a pressure hose 1 according to the invention for a water-carrying system (not shown). In particular, the pressure hose 1 is configured for connecting sanitary taps to a water supply line, especially an angle valve.

FIG. 2 shows a schematic longitudinal section through the pressure hose 1 according to the invention of FIG. 1.

The pressure hose 1 comprises a corrugated inner hose 2 to carry a flow of water, especially a flow of drinking water.

As is seen especially in FIG. 2, a first connecting piece 4 is provided or formed at a first hose end 3 of the pressure hose 1, and a second connecting piece 6 at a second hose end 5. In this case, the first connecting piece 4 is designed for connecting the first hose end 3 to a complementarily designed connecting piece of a sanitary tap, and the second connecting piece 6 for connecting the second hose end 5 to a complementarily designed connecting piece of a water supply line, especially an angle valve.

According to the invention, the inner hose 2 and the connecting pieces 4, 6 are made as a single piece, preferably by means of extrusion.

In order to ensure a pressure-resistant design of the pressure hose 1 according to the invention, a sheathing 7 is provided, especially a stainless steel or polyester braiding. In the exemplary embodiment shown, the sheathing 7 extends along the entire length of the inner hose 2 and also partially extends along the connecting pieces 4, 6. Connection portions at the connecting pieces 4, 6, by which the connecting pieces 4, 6 can be joined in sealing manner to complementary connecting pieces of a sanitary tap and/or to parts of a water supply line, are deliberately not enclosed by the sheathing 7. This simplifies the installation of the pressure hose 1 to parts of the water-carrying system.

For the preferably force-locking connection of the sheathing 7 to the inner hose 2 and the connecting pieces 4, 6, there is provided at each hose end 3, 5 a clamping element 8 in the form of a pressing sleeve. The clamping elements 8 press the sheathing 7 circumferentially against the inner hose 2 and against the connecting pieces 4, 6. This is merely for the purpose of securing the sheathing 7, and not to join the inner hose 2 and the connecting pieces 4, 6 to each other, as in the prior art.

Preferably, no narrowing of the cross section occurs in the region of the transition between the inner hose 2 and the connecting pieces 4, 6, so that there is no impairment of the flow behavior in this region.

It is not shown that the clamping elements 8 may also be multipiece, for example, in the form of two half shells. Furthermore, each clamping element 8 may also be provided as a winding, preferably a metal winding, in the region of the hose ends 3, 5.

In the following, the design of the connecting pieces 4, 6 shall be discussed more closely with the aid of FIGS. 3 and 4.

In the exemplary embodiment shown, the connecting pieces 4, 6 are formed completely free of corrugation with a cylindrical inner contour. The inner diameter of the connecting pieces 4, 6 may vary in the axial direction.

In particular, the connecting pieces 4, 6 form a corrugation-free prolongation of the inner hose 2, while the outer diameter of the connecting pieces 4, 6 adjacent to the inner hose 2 has substantially the same outer diameter as the inner hose 2. This makes possible a secure bearing and/or pressing against the sheathing 7 by means of the clamping element 8 and thus a kink-free configuration.

Furthermore, the connecting pieces 4, 6 have a larger inner diameter than the inner hose 2 adjacent to the inner hose 2, so that a widening of the flow cross section is formed at the transition from the inner hose 2 to the connecting pieces 4, 6.

FIG. 3 shows a first sectional enlargement of the first connecting piece 4 in the region of the first hose end 3. The first connecting piece 4 is preferably designed for connecting to a complementary designed connecting piece of a sanitary tap (not shown). The first connecting piece 4 is preferably designed so that it can be introduced preferably entirely axially into the sanitary tap, wherein the clamping element 8 may form an inserting end stop for the first connecting piece 4. Furthermore, the first connecting piece 4 has an encircling receiving groove 9 on its circumference to receive a sealing element 10. In the exemplary embodiment shown, the sealing element 10 is formed as a sealing ring with a rectangular cross section.

Figure 4:
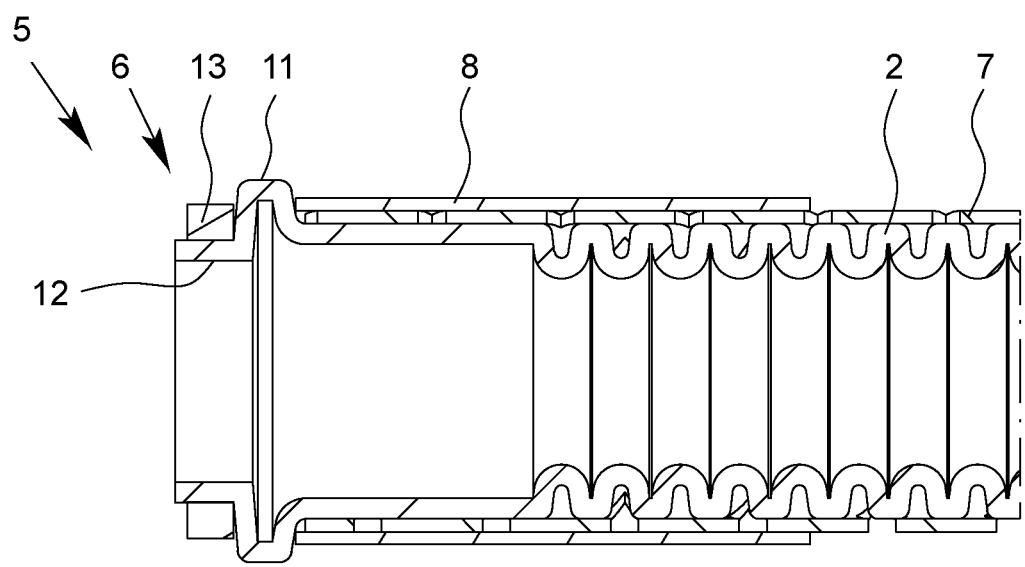
FIG. 4 shows a further enlarged section of FIG. 2 in the region of a second hose end of the pressure hose according to the invention.

FIG. 4 shows a second sectional enlargement of the second connecting piece 6 in the region of the second hose end 5. The second connecting piece 6 is preferably designed for connecting to a complementarily designed connecting piece of a water supply line, for example an angle valve. In the exemplary embodiment shown, the second connecting piece 6 is tightened by means of a tightening element (not shown), such as a union nut, against the complementarily designed connecting piece, wherein the tightening element can be screwed onto an external thread of the complementarily designed connecting piece. However, a corresponding tightening element, especially a union nut, may also be provided, of course, for the securing of the first connecting piece 4 to the complementarily designed connecting piece.

The tightening element may also be part of the pressure hose 1, held on it in captive manner.

The second connecting piece 6 comprises on its circumference a radially projecting shoulder 11, which forms in particular an abutment and/or an axial end stop for the tightening element and/or the clamping element 8. In this way, a secure attachment of the second hose end 5 and a compact construction are made possible.

For the end-face sealing of the second hose end 7, the second connecting piece 6 has at its end face a radially encircling holding region and/or receiving region 12 for holding and/or receiving a sealing element 13, preferably a sealing ring. The sealing element 13 can be slid and/or plugged onto the receiving region 12 as far as the shoulder 11. Preferably, the second connecting piece 6 has a larger inner diameter and/or flow cross section than the inner hose 2 in the region of the receiving region 12.

This makes it possible to tighten the second hose end 7 via the shoulder 11 by means of the tightening element against the complementary connecting piece, wherein in particular the sealing element 13 assures a reliable end-face sealing.

In the following, a further, second embodiment of the pressure hose 1 according to the invention shall be discussed, wherein the previous explanations apply in particular correspondingly or additionally, even if no repeat description is given.

FIG. 5 shows in a schematic side view a pressure hose 1 according to the invention in the second embodiment. FIG. 6 shows a schematic longitudinal section of the pressure hose 1 according to the invention shown in FIG. 5.

The second embodiment of the pressure hose 1 according to the invention differs from the first embodiment in particular regarding the configuration of the first connecting piece 4, whereas the second connecting piece 6 has substantially the same configuration in both embodiments. However, the first connecting piece 6 may also of course be adapted specifically to the manufacturer and/or country in the sense of the solution according to the invention.

Figure 7:
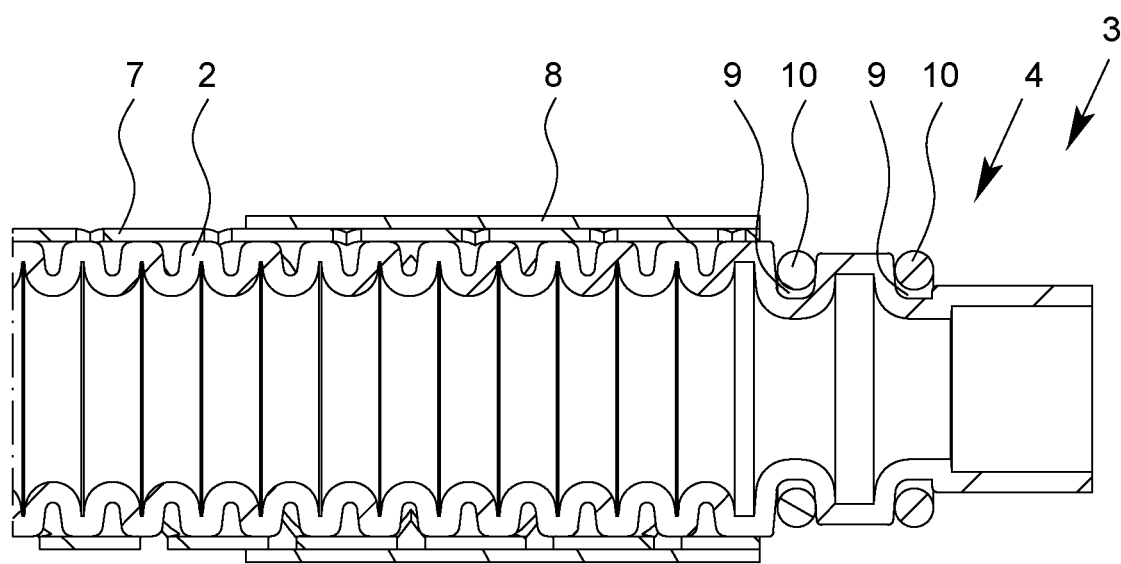
FIG. 7 shows an enlarged section of FIG. 6 in the region of the first hose end of the pressure hose.

FIG. 7 shows a sectional enlargement of the first connecting piece 4 in the region of the first hose end 3. In this variant, the first connecting piece 4 has two encircling receiving grooves 9 on its circumference, each receiving groove 9 accommodating a sealing element 10 configured as an O-ring. The sealing elements 10 are arranged offset from each other in the axial direction.

In the exemplary embodiment shown, the first connecting piece 4 has a smaller outer diameter than the inner hose 2 and a smaller inner diameter and/or flow cross section. The clamping element 8 may form an insert end stop here. This facilitates the insertion of the first hose end 3 into a complementary connecting piece.

Of course, the dimensioning and/or shaping and/or configuration of the connecting pieces may differ from the embodiments shown in the figures and accordingly the embodiments shown are merely exemplary in nature.

FIG. 8 shows a side view of a profile hose produced by continuous extrusion having first corrugated hose portions 26 arranged in an alternating manner in the longitudinal direction of the profile hose with further hose portions 27 and 28, which form the connection geometries for the connection to a sanitary tap. The dot-and-dash lines shown in FIG. 8 respectively designate a parting plane 25 at which the profile hose may be cut to length. Each further hose portion 27, 28 comprises two connection geometry portions 29, 30 arranged in succession in the longitudinal direction of the profile hose and in mirror symmetry to the parting plane 25, so that when the profile hose is cut to length along the respective parting plane 25 two hose portions are obtained with connecting pieces 4, 6 formed at the ends. In this way, one obtains individual corrugated inner hoses 2, each inner hose 2 being joined at both ends to a respective connecting piece 4 and 6 as a single piece. The cutting to length may be done by machining, for example by sawing.

FIG. 9 shows a side view of the pressure hose according to the invention in a third embodiment. The pressure hose 1 comprises a sheathing 7, two different connecting pieces 4, 6, and a sealing element 10.

Figure 10:
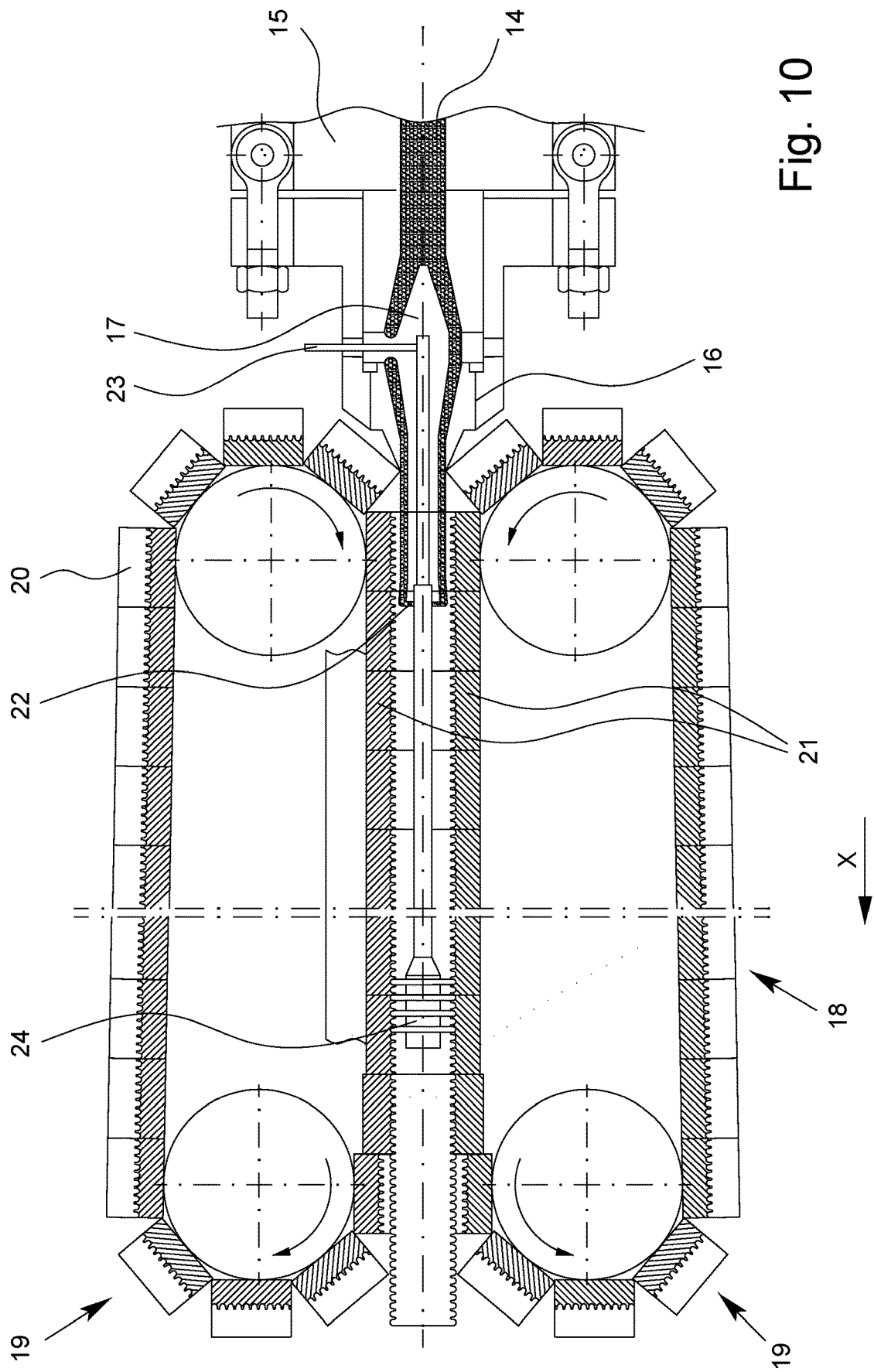

FIG. 10 shows a schematic representation of a device to carry out an extrusion process to produce a profile hose of the kind shown in FIG. 8. The molten material 14 is delivered from an extruder 15 through a nozzle 16. Inside the nozzle 16 there is arranged a mandrel 17. The mandrel 17 has the effect of making the molten material 14 leave the nozzle 16 as a tubular extrudate.

The molten material 14 is delivered from the nozzle 16 of the extruder 15 into a so-called corrugator 18. The corrugator 18 consists of two oppositely situated tool cycle systems 19. Each of the two tool cycle systems 19 forms a cycle of individual tool parts, so-called jaws 20. Preferably, the two tool cycle systems 19 have the same number of jaws 20. One jaw 20 of one tool cycle system 19 forms with one jaw 20 of the other tool cycle system 19 a pair of jaws 21, respectively. Opposite jaws 20 are brought together in the transport direction X prior to the exit 22 of the material 14 from the nozzle 16, thereby forming a pair of jaws 21. In this way, a start position of the pair of jaws 21 is defined.

If a pair of jaws 21 has just been brought together in the production direction X prior to the exit 22 of the material 14 from the nozzle 16 of the extruder 15, no material will yet have been delivered into this pair of jaws 21. The pairs of jaws 21 are conveyed in the transport direction X at the speed of production and/or extrusion. Material is conveyed into a first pair of jaws 21 starting at the time at which the first pair of jaws 21 reaches the exit 22 of the nozzle 16. Behind the first pair of jaws 21 in the production direction X, a second pair of jaws 21 is brought together at the start position and is thus available for the extrusion process. The two successively arranged pairs of jaws 21 lie firmly against each other, without forming a gap, and together form an extrusion tool extending in the production direction X. When the further pair of jaws 21 arranged behind the first pair of jaws 21 reaches the exit region 22 of the nozzle 16, the material 14 will be conveyed into the second pair of jaws 21 starting at that time. A further, third pair of jaws 21 behind the second pair of jaws 21 in the production direction X may be brought together behind the second pair of jaws 21 at the start position and lie against the second pair of jaws 21 without forming a gap. In this way, an extrusion tool consisting of a plurality of consecutive pairs of jaws 21 in the production direction X is formed, running in the production direction X.

The pairs of jaws 21 may have different internal geometries. Thus, a first pair of jaws 21 for example may form the outer geometry of a further hose portion 27 and a second pair of jaws 21 the outer geometry of a first hose portion 26 (cf. FIG. 8). A third pair of jaws 21 may form the outer geometry of a further hose portion 28 (cf. FIG. 8), thereby obtaining a profile hose with two different connection geometries. Subsequently, the geometry of a first hose portion 26 (FIG. 8) may be extruded with the aid of a fourth pair of jaws 21 directly onto this profile hose. Thus, a profile hose is produced consisting of alternately arranged first hose portions 26 and further hose portions 27, 28. In this way, a virtually endless profile hose can be formed, as shown in FIG. 8.

If the material 14 extruded into a pair of jaws 21 has cooled enough so that the shaped part, i.e., the portion of the profile hose, has a stable shape, the corresponding pair of jaws 21 can be opened. For this, the individual jaws 20 of the respective tool cycle systems 19 are moved perpendicular to the transport direction X, preferably in opposite directions. The individual jaws 20 may then be transported back, against the transport direction X, to the defined start point, namely, to a position in front of the exit 22 of the nozzle. The jaws 20 may then be brought together again to form a pair of jaws 21 and can then again receive extruded material 14 and shape it. The movement of the jaws 20 and/or the pairs of jaws 21 may be performed with the aid of a transport system, such as a chain drive and/or a rail system.

The mandrel 17 may have a compressed air feed 23, by which compressed air can be supplied by means of a pressurized duct in order to create an excess pressure inside the closed pairs of jaws 21 into which the material 14 is being conveyed. A sealing plug 24 may be arranged at a distance from the exit 22 of the nozzle 16 in the transport direction X. The sealing plug 24 has the effect that the excess pressure can act across a defined number of pairs of jaws 21, i.e., across a defined length. The excess pressure has the effect that the material 14 is pressed against the inner contour of the pairs of jaws 21, thereby forming the contour of the profile hose inside the pairs of jaws 21. Alternatively, a negative pressure can also be produced across the jaws 20, which likewise has the effect of pressing the material 14 against the inner contour of the jaws 20.

Depending on the material used, it may be necessary to keep the jaws 20 at a defined temperature. For this purpose, a cooling and/or a heating system may be necessary. When using PPSU as the material 14, it is advantageous for the jaws 20 to be heated to a temperature of around 250 to 300°

C. With other materials, temperature-adjustment of the jaws might not be necessary, or a cooling of the jaws may be advantageous.

After the corrugator 18, a cooling device may be provided (not shown), which further cools down the profile hose, for example with the aid of a water bath. Once the profile hose has been cooled down enough, the profile hose can be wound up on rolls of up to 500 to 700 m or even more. Alternatively, it is also possible to separate the profile hose at the parting planes 25 and to individually roll up, package, or immediately continue processing the inner hoses 2 obtained in this manner, which are connected respectively at their ends to connecting pieces 4 and 6 in a single-piece construction.

LIST OF REFERENCE NUMBERS

1 Pressure hose
2 Inner hose
3 Hose end
4 Connecting piece
5 Hose end
6 Connecting piece
7 Sheathing
8 Clamping element
9 Receiving groove
10 Sealing element
11 Shoulder
12 Receiving region
13 Sealing element
14 Material
15 Extruder
16 Nozzle
17 Mandrel
18 Corrugator
19 Tool cycle system
20 Jaw
21 Pair of jaws
22 Exit
23 Compressed air feed
24 Sealing plug
25 Axis of symmetry
26 Hose portion
27 Hose portion
28 Hose portion

The invention claimed is:

1. A pressure hose adapted for a water-carrying system for connecting sanitary taps, comprising:
a hose portion made of plastic,
a first connecting piece provided at an end of the pressure hose, the first connecting piece differing in shape from the hose portion,
a second connecting piece provided at an opposite end of the pressure hose, the second connecting piece having a different shape than the hose portion and the first connecting piece, and
first and second sealing elements,
wherein the hose portion and the first and second connecting piece are one monolithic element of one material,
wherein the second connecting piece comprises at an end face a receiving region on which the second sealing element is received,
wherein the second connecting piece has on a circumference at least one radially protruding shoulder, the shoulder forming an axial end stop for a tightening element, wherein the shoulder is arranged between the receiving region and second sealing element on one side and the hose portion on an opposite side,
wherein the first connecting piece comprises an encircling groove on a circumference in which the first sealing element is received, and
wherein the first connecting piece does not include a shoulder that is configured to enable axial insertion into a complementary connecting piece.

2. The pressure hose according to claim 1, wherein the pressure hose is adapted for a water pressure of 40 bar or more.

3. The pressure hose according to claim 1, wherein the hose portion and the connecting piece are made of polyphenylsulfone.

4. The pressure hose according to claim 1, wherein the hose portion is surrounded over an entire length by a sheathing.

5. The pressure hose according to claim 4, wherein the sheathing is pressed onto the hose portion at least at one hose end from the outside by a clamping element or a pressing sleeve.

6. The pressure hose according to claim 1, wherein at least one of the first and second connecting piece has, in a transitional region to the hose portion, a larger inner diameter or flow cross section than the hose portion.

7. The pressure hose according to claim 1, wherein the first connecting piece has a further encircling receiving grooves on its circumference, accommodating a third sealing element, the third sealing element being arranged offset from the first sealing element in an axial direction.

8. The pressure hose according to claim 1, wherein the second connecting piece comprises an adjoining region adjoining the hose portion,
wherein the shoulder is arranged between the receiving region and second sealing element on the one side, and the adjoining portion and hose portion on the opposite side,
wherein both an inner and an outer diameter of the second connecting piece are smaller in the receiving region than in the adjoining region.

* * * * *